United States Patent [19]

Knasel et al.

[11] Patent Number: 4,954,005
[45] Date of Patent: * Sep. 4, 1990

[54] SAFETY COUPLING DEVICE FOR ROBOTIC TOOLING

[75] Inventors: Harold E. Knasel, Springfield; David A. Grigsby, Medway, both of Ohio

[73] Assignee: Process Equipment Company, Tipp City, Ohio

[*] Notice: The portion of the term of this patent subsequent to Jan. 27, 2004 has been disclaimed.

[21] Appl. No.: 385,231

[22] Filed: Jul. 25, 1989

Related U.S. Application Data

[63] Continuation of Ser. No. 88,559, Aug. 24, 1987, abandoned, which is a continuation-in-part of Ser. No. 6,923, Jan. 26, 1987, Pat. No. 4,786,769, which is a continuation of Ser. No. 708,561, Mar. 6, 1985, Pat. No. 4,639,184.

[51] Int. Cl.⁵ .................. F16D 3/16; B25J 19/06; B25J 17/02
[52] U.S. Cl. .................. 403/57; 403/59; 403/116; 901/29; 901/49; 414/730
[58] Field of Search .............. 403/56, 57, 59, 53, 403/78, 116, 114, 113, 131; 901/49, 29, 45, 9; 414/730, 735; 464/120, 123, 124, 111, 162

[56] References Cited
U.S. PATENT DOCUMENTS

| | | |
|---|---|---|
| 4,318,282 | 3/1982 | Orain . |
| 4,514,616 | 4/1985 | Warner . |
| 4,516,957 | 5/1985 | Chyz et al. ............ 464/123 X |
| 4,540,331 | 9/1985 | Stanner et al. ........ 901/49 X |
| 4,573,271 | 3/1986 | Hamilton et al. . |
| 4,655,674 | 4/1987 | Kohler et al. . |
| 4,661,037 | 4/1987 | Sugino et al. . |
| 4,700,932 | 10/1987 | Katsuno ............... 901/49 X |

*Primary Examiner*—Peter M. Cuomo
*Attorney, Agent, or Firm*—Jacox & Meckstroth

[57] ABSTRACT

A coupling device includes a first support member which is connected to the arm of a robot and which supports a second support member for precision universal tilting and axial and/or rotary movement from an aligned normal position. The second support member supports robotic tooling, and a set of springs or springs and ball members or fluid actuated piston bias the support members to the normal position. An electrical control circuit is effective to stop movement of the robot arm in response to minute tilting or axial or rotary movement of the second support member in the event the tooling or article carried by the tooling is accidentally hit or overloaded. A set of semi-circular rings and auxiliary springs are attached to the support members for producing a substantial biasing force towards the normal position, and a set of construction balls and corresponding seats are used to establish a precision normal position.

10 Claims, 3 Drawing Sheets

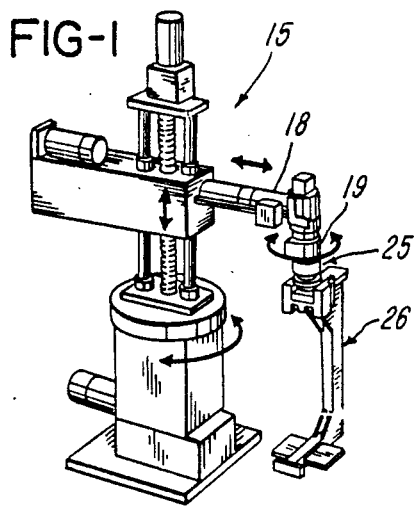
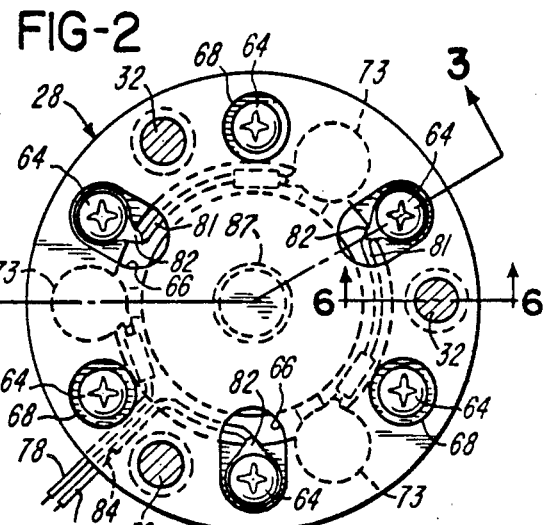
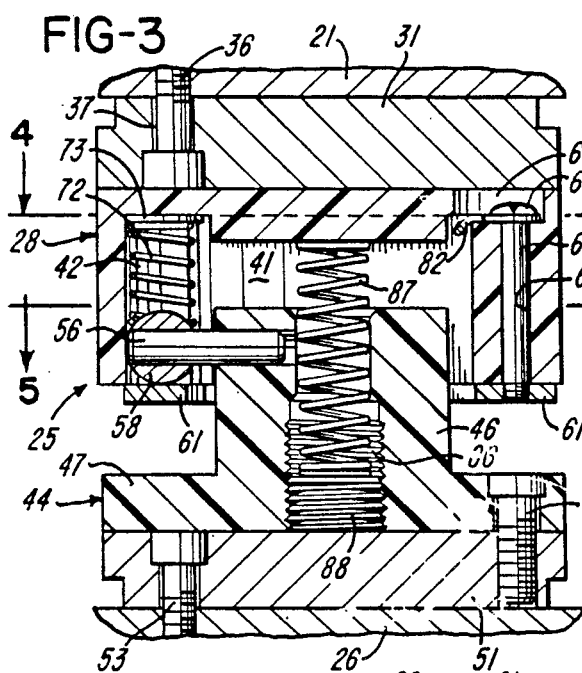
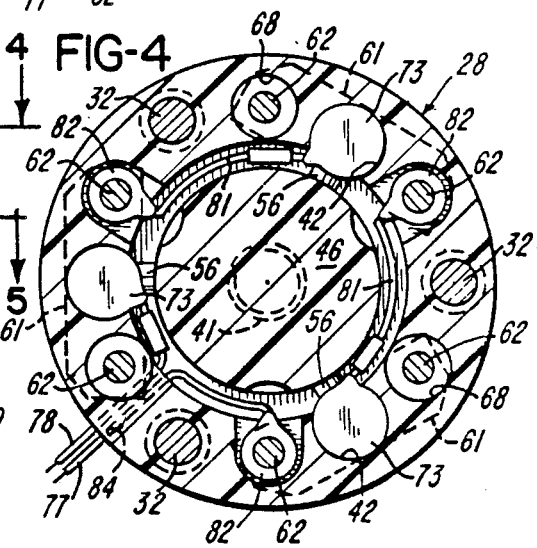
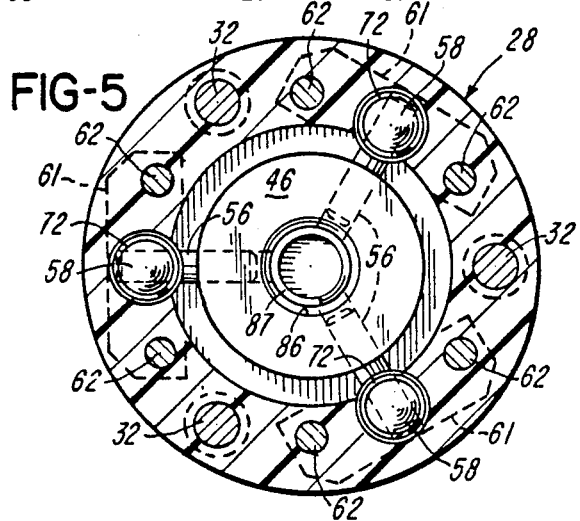
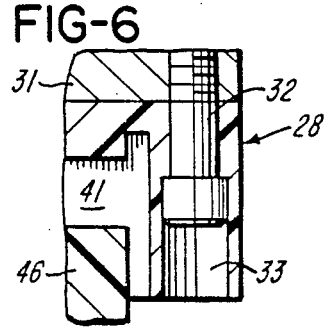

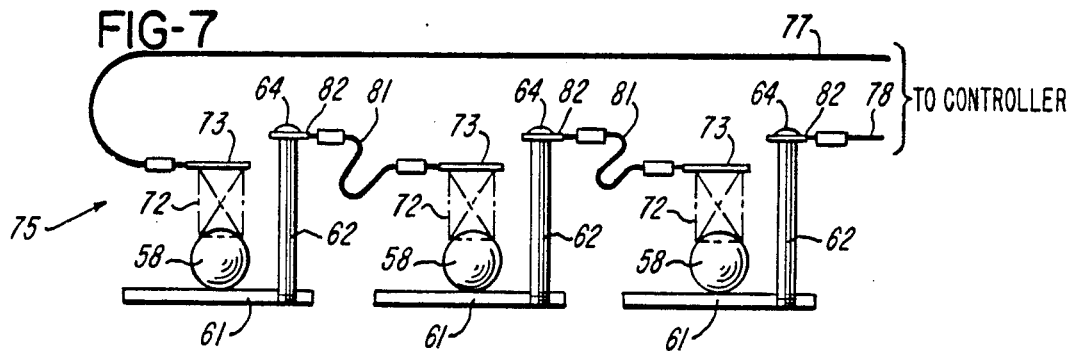
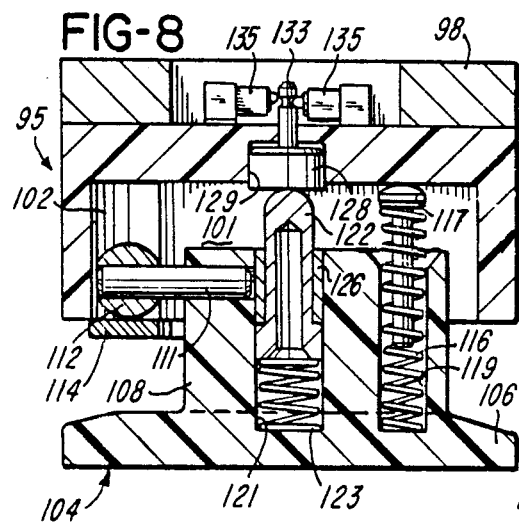
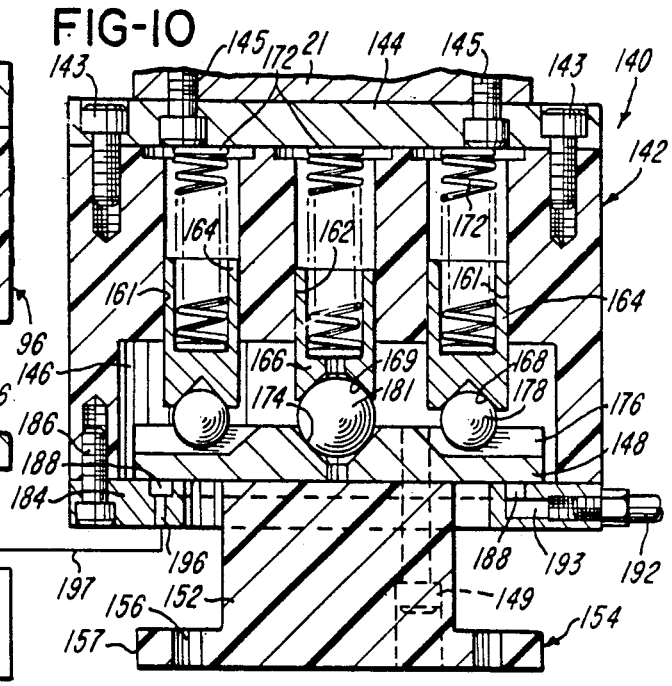
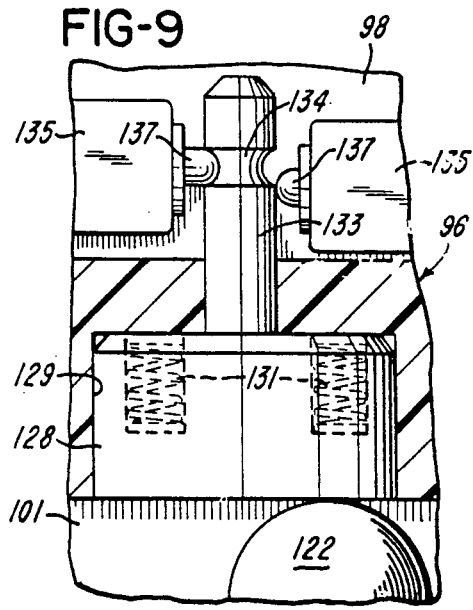
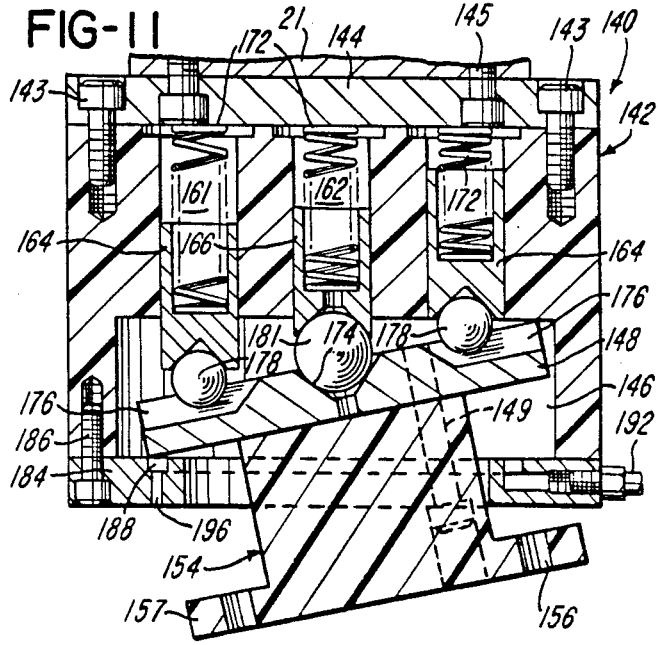

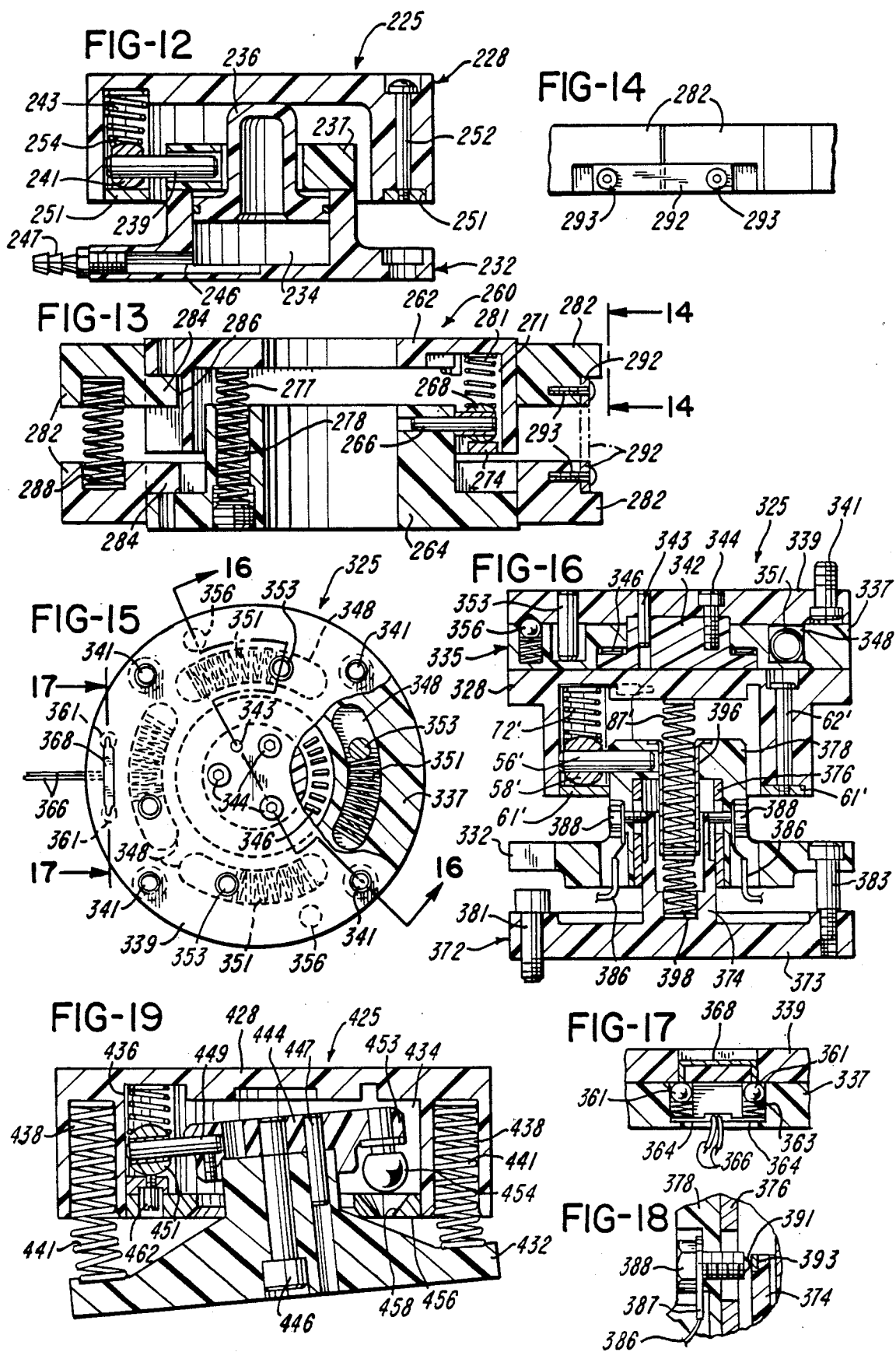

SAFETY COUPLING DEVICE FOR ROBOTIC TOOLING

This is a continuation of Ser. No. 088,559, filed Aug. 24, 1987, abandoned, which is a continuation-in-part of Ser. No. 006,923, filed Jan. 26, 1987, U.S. Pat. No. 4,786,769, which is a continuation of Ser. No. 708,561, filed Mar. 6, 1985, U.S. Pat. No. 4,639,184.

BACKGROUND OF THE INVENTION

In the use of numerically controlled or programmable robots, it is desirable to protect the robot and the tooling carried by the robot arm in addition to any article carried by the tooling in the event the article or tooling inadvertently or accidentally hits an object while the robot arm is in motion. Usually, such protecting is provided by a coupling or link member which connects the robot arm to the tooling and is adapted to break or slip if the tooling or article carried by the tooling receives an impact or force. When a link member breaks, the tooling usually drops to the limit of a retaining chain or cable. A maintenance man or operator must then replace the link member and repair any damage to the robot and/or tooling before the robot may be placed back in operation. Usually, such replacement and/or repair requires substantial time, and this results in production down time for not only the robot but other associated equipment which the robot is serving.

One form of safety device or mechanism is disclosed in International Patent Application No. PCT/JP81/00377 published by the Japanese Patent Office on Jun. 24, 1982. The mechanism disclosed in this patent application forms a coupling between the robot arm and the fixture or tooling supported by the arm and includes a weight element supported by a set of tension springs. Movement of the weight element in response to a lateral impact or force on the fixture or tooling results in actuating a switch which stops the movement of the robot arm. However, if the tooling or article carried by the tooling inadvertently hits a stationary object or an object having substantial mass, the robot arm or tooling or article may be damaged before the robot arm stops. If the tooling or robot arm is bent, substantial down time may be required to repair the arm or tooling and also realign the tooling with respect to the robot arm.

SUMMARY OF THE INVENTION

The present invention is directed to an improved safety wrist or coupling device for connecting a robot arm to a fixture or tooling and which provides for immediately stopping the movement of the robot arm and tooling in the event the arm or tooling or article carried by the tooling accidentally receives any interfering impact or force during movement of the robot arm. The safety coupling of the invention also provides for substantial tilting and axial movement and rotary movement of the tooling relative to the arm in response to the interfering force in order to prevent any damage to the tooling or robot. In addition, the coupling automatically realigns the tooling with respect to the robot arm as soon as the interfering force is removed. Also, the coupling device of the invention responds to minute tilting or axial or rotary movement of the tooling relative to the robot arm and immediately controls or actuates the emergency stop circuit for the robot.

In general, the above features and advantages are provided by a safety coupling which is compact and has a low mass which includes a first body or support member adapted to be rigidly secured to the robot mounting flange. The first support member receives a second support member which is adapted to be rigidly secured to the tooling or device which is moved by the robot along a preprogrammed path. The first and second support members of the coupling device are interconnected to provide for a relative axial and tilting movement in a multi-axis universal direction from a normal position where the support members are precisely aligned. A set of spring-biased balls provide for the tilting movement and are effective to return the support members to the normal position when the force producing the tilting movement is released. The coupling device also incorporates an electrical circuit with a switch contact system which opens the circuit in response to minute tilting or axial or rotary movement of the second support member relative to the first support member.

Other features and advantages of the invention will be apparent from the following description, the accompanying drawings and the appended claims.

BRIEF DESCRIPTION OF THE DRAWINGS

FIG. 1 is a perspective view of a programmable robot incorporating a safety coupling device constructed in accordance with the invention for supporting a specific tooling component;

FIG. 2 is a plan view of the coupling device shown in FIG. 1;

FIG. 3 is an axial section of the coupling device taken generally along the line 3—3 of FIG. 2 and showing the attachment of the device to the robot arm and to the tooling;

FIG. 4 is a section taken generally on the line 4—4 of FIG. 3;

FIG. 5 is a section taken generally on a line 5—5 of FIG 3;

FIG. 6 is a fragmentary section taken generally on the line 6—6 of FIG. 2;

FIG. 7 is a diagrammatic view of the components in the coupling device shown in FIGS. 1-6 for forming a control switch system;

FIG. 8 is an axial section similar to FIG. 3 an showing a coupling device constructed in accordance with another embodiment of the invention;

FIG. 9 is an enlarged fragmentary section of the control components used in the embodiment shown in FIG. 8;

FIG. 10 is an axial section similar to FIG. 3 and showing a further embodiment of a coupling device constructed in accordance with the invention;

FIG. 11 is an axial section of the device shown in FIG. 10 and illustrating the maximum tilt relationship.

FIG. 12 is an axial section similar to FIG. 3 of a coupling device constructed in accordance with another embodiment of the invention;

FIG. 13 is an axial section of an annular coupling device constructed in accordance with a further embodiment of the invention;

FIG. 14 is a fragmentary view taken generally on the line 14—14 of FIG. 13;

FIG. 15 is a plan view of another coupling device constructed in accordance with another embodiment of the invention and with portions broken away;

FIG. 16 is an axial section taken generally on the line 16—16 of the embodiment shown in FIG. 15;

FIG. 17 is a fragmentary section taken generally on the line 17—17 of FIG. 15;

FIG. 18 is an enlarged fragmentary section of the switch contacts shown in FIG. 16; and FIG. 19 is an axial section similar to FIG. 3 and showing a coupling device constructed in accordance with a further embodiment of the invention.

DESCRIPTION OF THE PREFERRED EMBODIMENTS

FIG. 1 illustrates a numerically controlled programmable robot 15 of the type manufactured by GMF Robotics Corporation in Troy, Mich. and identified as Model M1. However, it is to be understood that the coupling device of the present invention may be used with any form of robot, transfer or positioning mechanism or manipulator and is not limited to the particular form of robot illustrated. The robot 15 includes a horizontal movable arm 18 which supports a reversing motor 19 having a rotatable bottom mounting flange 21 (FIG. 3). In accordance with the present invention, a safety device or coupling 25 connects the mounting flange 21 to a depending fixture or tooling 26 constructed for gripping and transferring an article. As used herein, the term "tooling" includes any type of fixture or article transporting device or work performing device such as, for example, a welding head.

Referring to FIGS. 2-6, the safety device or coupling 25 includes a first or upper body or support member 28 which is preferably made from a high strength rigid plastics material having a high strength/weight ratio. The upper support member 28 is secured to an adaptor plate 31 by a set of cap screws 32 (FIG. 6) which extend upwardly through counterbored holes 33 within the support member 28. The adaptor plate 31 is secured to the robot mounting flange 21 by a set of cap screws 36 which extend through corresponding counterbored holes 37 within the adaptor plate 31.

The upper support member 28 defines a generally cylindrical cavity or chamber 41, and a set of three cylindrical bores 42 extend vertically within the support member 28, intersecting the chamber 41 at uniformly spaced locations. The coupling 25 also includes a second or lower support body or member 44 also made of a high strength plastics material and having a cylindrical hub portion 46 projecting upwardly from a flange portion 47. A set of cap screws 49 secured the flange portion 47 to an adaptor plate 51 which is rigidly secured to the tooling 26 by a set of cap screws 53.

As shown in FIGS. 3 and 5, a set of three spoke-like pins 56 project radially outwardly from the hub portion 46 of the lower support member 44 and into the corresponding bores 42 within the upper support member 28. A part spherical metal ball member 58 is slidably mounted on each pin 56 and is closely confined within the corresponding cylindrical bore 42. Each of the ball members 58 engages a corresponding flat metal contact plate 61 which is secured to the bottom of the support member 28 by a pair of screws 62 extending within vertical holes 63 formed within the upper support member 28. Each of the screws 62 has a head 64, and three of the heads 64 are recessed within corresponding slots 66 formed within the top surface of the support member 28. The heads 64 of the other three screws 62 are located within cylindrical recesses 68 formed within the top surface.

A compression spring 72 is confined within each of the bores 42 and has a bottom end which seats on the corresponding ball member 58. The upper end of each spring 72 engages a circular metal contact plate 73 (FIGS. 3 and 4) located within the upper end of the bore 42. As illustrated in FIG. 7, the metal ball members 58, metal contact plates 61, springs 72, contact plates 73 and screws 62 form part of an electrical control circuit 75 wherein the three sets of these components are connected in series with wire conductors 77 and 78 by wire conductors 81 and ring terminals 82. Each of the conductors 81 connects one of the contact plates 73 to one of the terminals 82 retained by the screws 62. As shown in FIGS. 2 and 4, the conductor wires 81 extend around the upper end of the chamber 41 within a groove, and the conductors 77 and 78 extend outwardly through a radial hole 84 within the upper support member 28. The conductors 77 & 78 are connected to the ground side or hot side of an emergency stop circuit or an input/output circuit (not shown) for programming the robot 15. As shown in FIG. 3, the hub portion 46 of the lower support member 44 has a threaded center hole 86 which confines a compression spring 87 extending from the top inner surface of the upper support member 28 to an adjustable plug 88 threaded into the lower portion of the hole 86.

In operation of the coupling device 25 described above in connection with FIGS. 1-7, the set of three compression spring 72 cooperate with the compression spring 86 to urge or bias the lower support member 44 away from the upper support member 28 to an aligned normal position when the three ball members 58 engage the corresponding contact plates 61. This biasing force may be adjusted by adjusting the plug 88 within the bore 86 and/or by selecting springs 72 and/or 86 having different spring rates. The biasing force is selected according to the load carried by the coupling 25 as determined by the weight of the tooling 26 and the article being transported by the tooling.

It is apparent that the connection of the upper and lower support members by the spring loaded ball members 58 slidably mounted both within the bores 42 and on the radial pins 56, provides for universal tilting movement of the tooling support member 44 relative to the upper support member 28 and also permits relative axial movement of the support member 44 into the support member 28. Thus if the tooling 26 or an article carried by the tooling inadvertently hits an object during movement of the robot arm 18, the tooling and the tooling support member 44 will tilt or move relative to the upper support member 28. It is also apparent that any movement of the tooling support member 44 relative to the upper support member 28 would cause at least one of the ball members 58 to separate from its corresponding contact plate 61. This separation opens the circuit with respect to the conductors 77 and 78 causing an immediate signal to stop any movement of the robot arm 18. With the biasing and axial movement allowed, the robot can overtravel or coast a short distance without damaging the tooling or robot. As soon as the force is removed from the tooling 26, the tooling and lower support member 44 return to the aligned normal position (FIG. 3) when all of the ball members 58 engage the corresponding contact plates 61 and again complete the circuit.

Referring to FIGS. 8 and 9 which show another embodiment of a safety coupling device 95 constructed in accordance with the invention, an upper support body or member 96 is adapted to be secured to the robot mounting flange 21 by an annular adaptor plate 98 in the same manner as described above for the attachment of the support member 28. The upper support member 96 has a chamber or cavity 101 which intersects a set of three angularly spaced cylindrical bores 102. The coupling member 95 also includes a lower support body or member 104 having a bottom flange portion 106 and a hub portion 108 projecting upwardly into the cavity 101, similar to the arrangement decribed above for the embodiment shown in FIGS. 2-6.

A set of three angularly spaced pins 111 are supported by the hub portion 108 and project radially outwardly to support corresponding ball members 112 within the cylindrical bores 102. A set of three contact plates 114 attached to the bottom surface of the support member 96 in the same manner as the attachment of the plates 61 described above in reference to FIGS. 3-5. The balls 112 are normally urged or biased against the plates 114 by a set of three compression springs 116 surrounding corresponding plungers 117 and retained within corresponding holes 119 within the hub portion 108 of the lower support member 104. Thus the support members 96 and 104 are coupled or connected together to provide for relative tilting and/or axial movement in a manner similar to the tilting movement between the support members 28 and 44 described above.

A bore or hole 121 is formed within the center of the hub portion 108 and confines a plunger 122 and a compression spring 123 which urges or biases the plunger 122 upwardly against a stop sleeve 126 pressed into the bore 121. The upper rounded end of the plunger 122 engages the flat bottom surface of another plunger 128 slidably supported within a bore 129 formed within the upper support member 96. The plunger 128 is urged or biased downwardly against the plunger 122 by a set of compression springs 131 (FIG. 9) confined within holes formed within the top of the plunger 128. The plunger 128 also includes an actuating stem 133 which projects upwardly into the center of the adaptor plate 98 and has a circumferential groove 134. A pair of limit switches 135 are positioned in opposing relation within the adaptor plate 98 and with the stem 133 located between the actuating buttons or elements 137 of the switches. The switches 135 are connected in series on the ground side or hot side of the emergency stop circuit or an input/output circuit for the robot in the same manner as the conductors 77 and 78.

In operation of the coupling device 95, the support members 96 and 104 are biased towards the aligned normal position (FIG. 8) wherein the ball members 112 engage the corresponding plates 114 as a result of the force exerted by the compression springs 116. In the event the support member 104 is tilted or shifted axially by a minute degree or distance as the result of a force acting on the tooling 26 attached to the support member 104, the plunger 128 is shifted upwardly by a few thousandths of an inch causing the right limit switch 135 (FIG. 9) to open and the left limit swicth (FIG. 9) to close. This insures that both switches are operating. The force exerted by the compression spring 123 is greater than the force exerted by the compression springs 131 so that the plunger 122 will depress the plunger 128 in response to minute tilting or axial movement of the support member 104 relative to the support member 96. Overtravel is accommodated by allowing plunger 122 to stop against plunger 128 and compress spring 123 as the lower support member 104 continues to move in a tilting or axial direction.

Another embodiment of a coupling device constructed in accordance with the invention is illustrated in FIGS. 10 and 11. In this embodiment, a coupling device 140 includes an upper support body or member 142 which is secured by a set of screws 143 to an adaptor plate 144, and a set of screws 145 secure the adaptor plate 144 to the robot mounting flange 21. The support member 142 has a cylindrical chamber or cavity 146 which receives a circular metal plate 148 secured by screws 149 to the hub portion 152 of a lower support member 154. A set of holes 156 are formed within the bottom flange portion 157 of the lower support member 154 and receive a set of screws (not shown) for securing the lower support member 154 to tooling such as the tooling 26.

A set of four uniformly spaced vertical holes 161 and a center vertical hole 162 are formed within the upper support member 142 and receive corresponding plungers 164 and 166 which have conical bottom surfaces 168 and 169. Each of the plungers 164 and 166 receives a compression spring 172 which urges the plunger downwardly within its corresponding hole 161 and 162. The plate 148 has a conical center cavity 174 and a set of four uniformly spaced and radially extending V-shaped notches or grooves 176. A set of four balls 178 are confined between the bottom surfaces 168 of the plungers 164 and the corresponding slots 176, and a larger ball 181 is confined between the bottom surface 169 of the center plunger 166 and the conical surface 174 within the center of the plate 148.

An annular metal plate 184 is secured to the bottom of the support member 142 by a set of peripherally spaced screws 186, and an annular groove 188 is formed within the top flat surface of the plate 184. The bottom surface of the metal plate 148 closes the annular groove 188, and the contacting surfaces of the plates 148 and 184 are lapped to form a substantially air tight seal between the surfaces. An air supply line 192 is connected to the annular groove 188 by a passage 193 within the plate 184 and supplies pressurized air to the groove 188 according to a predetermined pressure, for example, 10 psi. A passage 196 within the plate 184 connects the groove 188 to an air line 197 which extends to an air logic pressure control switch 198.

In operation of the embodiment described above in connection with FIGS. 10 and 11, the switch 198 is connected in series with the ground side or hot side of the emergency stop circuit or an input/output circuit for the robot 15 and is closed when the switch 198 receives or senses the air pressure within the groove 188 through the line 197. In the event the lower support member 154 is tilted in any direction or shifted axially by a minute amount, the plate 148 tilts or moves with respect to the plate 184 so that the air pressure within the groove 188 is released. When the air pressure is released, the switch 198 opens causing a signal to stop all movement of the robot arm 18. FIG. 11 illustrates the maximum angle of tilting of the lower support member 154 and tooling relative to the upper support member 142, but the air pressure within the groove 188 is released in response to the slightest movement of the plate 148 relative to the plate 184. When the force on the tooling 26 causing the movement of the plate 148 is released or removed, the spring loaded plungers 164 and 166 and the balls 178 and 181 automatically return the support members 142 and 154 to their aligned normal position shown in FIG. 10.

Referring to FIG. 12, a coupling device 225 is constructed similarly to the coupling device 25 described above in connection with FIGS. 2–6, and includes a first or upper support member 228 and a second or lower support member 232. The upper support member 228 is constructed substantially the same as the upper support member 28 described above, but the lower support member 232 defines a fluid cylinder chamber 234 which receives an axially movable piston 236. An annular hub plate or member 237 confines the piston 236 and supports six uniformly spaced pins 239 which projects radially outwardly to support corresponding sliding balls 241 located within part-cylindrical cavities or slots 243 within the support member 228. The chamber 234 receives pressurized fluid or air through a passage 246 connected by a fitting 247 to a flexible hose or line (not shown) extending from a fluid or air supply line.

Each of the six balls 241 normally contact a corresponding metal plate 251, and each plate 251 is retained by a paor of screws 252. A set of light compression springs 254 are located within the slots 243, and the balls 241 and plates 251 are electrically connected in series by the springs 254 and screws 252, in the same manner as described above in connection with FIG. 7. In the embodiment shown in FIG. 12, the piston 236 replaces the compression spring 87 (FIG. 3) for biasing the support members 228 and 232 to their aligned normal position, shown in FIG. 12. The pressure of the fluid or air within the chamber 234 may be conveniently changed accordind to the desired degree of stiffness for the coupling 225, and the fluid pressure may be varied during a cycle of operation of the robot 15 if such variation is desired.

Another modification of a coupling device constructed in accordance with the invention, is shown in FIGS. 13 and 14. In this embodiment, a coupling 260 includes an upper support member 262 and a lower support 264, and both of the support members 262 and 264 are annular to provide a center opening which is sometimes desirable for directing electrical control lines or fluid actuated lines or a control mechanism. The support members 262 and 264 are connected by a set of four pins 266 and corresponding sliding balls 268 within part-cylindrical slots 271. The balls 268 are normally urged against corresponding plates 274 by a set of eight uniformly spaced compression springs 277 confined within corresponding cylindrical bores 278 within the lower support member 264. The balls 268 and plates 274 are electrically connected in series through corresponding compression springs 281, in the same manner as described above in connection with FIG. 7.

The embodiment of FIG. 13 also illustrates an accessory or add-on biasing system which cooperates with the spring 277 to urge the support members 262 and 264 to the normal position shown in FIG. 13. This auxillary biasing means includes two pairs of semi-circular ring sections 282 which mount on the support members 262 and 264. Each of the half-circle ring sections 282 include circumferentially spaced lugs 284 which project inwardly above the bottom flange of the lower support member 264 and into peripherally spaced recesses 286 within the upper support member 262. A set of eighty uniformly spaced compression springs 288 extend between the upper pair of ring sections 282 and the lower pair of ring sections 282, and the springs 288 are selected for producing the desired degree of stiffness of the coupling 260, with the balls 268 pressing against the corresponding plates 274 with a predetermined force.

The upper pair of semi-circular ring sections 282 are secured together by a pair of diametrically opposed straps 292 which are secured by screws 293 to the ring sections 282. The lower pair of ring sections 282 are also secured together by a pair of diametrically opposed straps 292 so that the straps 292 lock the ring sections 282 to the support members. Since the ring sections 282 are formed in mating half sections, they may be added on to the support members 262 and 264 after the support members are assembled. The ring sections 282 may alos be conveniently removed for interchanging compression springs 288 when it is desired to change the total biasing force between the support members. When the ring sections 282 are detached from the support members 262 and 264, the straps 292 are pivoted 90° and used to connect an upper ring section to a corresponding lower ring section, as indicated by the dotted lines in FIG. 13. The compression springs 288 are thereby confined between the corresponding ring sections 282 during shipping and storage and while the ring sections are being assembled onto the support members.

Another embodiment of a coupling device constructed in accordance with the invention, is illustrated in FIGS. 15–18. In this modification, a coupling device 325 includes an upper support member 328 (FIG. 16) and a lower support member 332 which are constructed similarly to the corresponding support members 28 and 44 described above in connection with FIG. 3. Accordingly, the corresponding components of the support members 328 and 332 are identified with the same reference numbers as used in FIGS. 2–4, but with the addition of a prime mark.

As also shown in FIGS. 15–17, the upper support member 328 of the coupling device 325 is connected to the support flange 21 of the robot 15 by a rotary sensing unit 335 which permits limited rotation of the support member 328 relative to the flange 21. The rotary unit 335 includes an annular bearing member or plate 337 which is rigidly secured to the support member 328 by a set of screws (not shown). The plate 337 is covered by a circular plate 339 which is secured to the flange 21 by a set of four screws 341. The plate 339 carries a center bearing member or plate 342 which is secured to the plate 339 by a pin 343 and sets of screws 344. An antifriction needle-type thrust bearing 346 is confined between the bearing hub 342 and an inner flange of the bearing plate 337.

A set of four arcuate cavities 348 (FIG. 15) are formed within the plate 377 and receive a corresponding set of compression springs 351. A set of studs or pins 353 are secured to the plate 339 and project downwardly into the cavities 351 adjacent corresponding ends of the springs 351. Thus the plate 337 may rotate in opposite directions from a normal position (FIG. 15) through a predetermined angle, for example, plus or minus fifteen degrees. A pair of diametrically located spring biased ball detents 356 provide for a positive home or normal position for the plate 337 relative to the plate 339 when the two pairs of opposing springs 351 are balanced.

As also shown in FIGS. 15 and 17, the plate 337 has a pair of holes which confine a corresponding pair of metal balls 361. The balls 361 are electrically connected by corresponding compression springs 363 and contacts 364 connected to a corresponding pair of electrical conducting wires 366. When the plates 337 and 339 are in their normal or home position, the balls 361 are electrically connected by an inverted U-shaped copper wire or strip 368 which is carried by the upper plate 339. Thus when the plate 337 rotates very slightly relative to the plate 339, the balls 361 roll out of contact with the end of the strip 368 and open the circuit between the conductor wires 366. The wires 366 are connected to the controller for the robot 15 in the same manner as the conductor wires 77 and 78 are connected, as described above in connection with FIG. 7. When the force tending to rotate the support 328 is removed, one pair of the springs 351 rotate the support member 328 back to its home or normal position shown in FIG. 16.

In addition to the rotary sensing unit 335, the coupling device 325 shown in FIG. 16 also includes a vertical sensing unit 372 which includes a support member 373 having a hub portion 374 projecting upwardly into a bushing 376 confined within the hollow hub portion 378 of the lower support member 332. The support member 373 is connected to the adapter plate 51 (FIG. 3) by a set of screws 381, and a set of screws 383 connect the member 373 to the support member 332 so that the member 372 may move or slide vertically within the bushing 376 but is prevented from rotating relative to the support member 332 by the screws 383.

A pair of electrical conductors or wires 386 extend upwardly through holes within the support member 332 to connectors 387 mounted on a pair of diametrically opposed conductors screws 388 (FIG. 18) each enclosing a spring biased contact plunger 391. The upper end of the hub portion 374 of the support member 372 carries a copper ring or band 393 (FIG. 18) which normally completes an electrical circuit through the screws 388 and conductor wires 386. As shown in FIG. 16, the compression spring 87' which biased the support members 328 and 332 to their aligned normal position, is confined within a metal tube or can 396 which mounts on the hub portion 378 of the support member 332. A much lighter compression spring 398 extends between the bottom of the can 396 and the member 373 to urge the member 373 downwardly to its normal position (FIG. 16) where the band 393 completes the circuit for the conductor wires 386.

The spring 398 produces a substantially lower force than the spring 87', for example, 1/10 of the force, so that the member 373 is significantly more sensitive to vertical movement than is the member 332. When the member 373 moves upwardly by a minute distance, the conductor band 393 moves out of contact with the contact plungers 391 in order to open the circuit of the wire conductors 386 which extend to the controller for the robot.

Referring to FIG. 19, a coupling device 425 is also constructed similarly to the coupling device 25 described above, but provides for more precise alignment between an upper support member 428 and a lower support member 432. As shown in FIG. 19, the upper support member 428 defines an internal cavity or chamber 434 which extends to three uniformly spaced part-cylindrical bores 436. A set of six uniformly spaced holes or bores 438 are also formed within the support member 428 and receive corresponding compression springs 441 which engage the flange portion of the lower support member 432.

The hub portion of the support member 432 supports a plate 444 which is secured to the support member 432 by a center screw 446 and a locating pin 447. The plate 444 supports three uniformly spaced radial pins 449 each of which carries a sliding ball 451 confined within the corresponding bore 436. The plate 444 also includes three uniformly spaced and outwardly projecting ears 453 which supports the stem portions of three precision and hardened construction balls 454.

The upper support member 428 carries a bottom plate 456 in which is formed three conical seats 458 for receiving the precision balls 454. The balls 454 and corresponding seats 458 cooperate to form a precision normal position for the aligned support members 428 and 432, and the springs 441 bias the support members to this normal position. In the normal position, each of the balls 451 contacts a screw 462 which is adjustable within the bottom plate 456. When the three balls 454 engage the corresponding seats 458, the screws 462 are adjusted so that extremely minute tilting movement of the support member 432 breaks the electrical connection between one of the balls 451 and the corresponding screw 462 for opening the circuit to the controller for the robot. The adjustment of the screws 462 compensate for any clearance between the balls 451 and the pins 449 on which the balls slide.

From the drawings and the above description, it is apparent that a coupling device constructed in accordance with the present invention, provides desirable features and advantages. For example, in each of the coupling embodiments described above, the upper and lower support members are normally held in precise alignment and in fixed relation by the compression springs or fluid piston and the confined ball members. However, with a very minute relative tilting or axial or rotary movement between the support members, the emergency stop circuit opens and stops all movement of the robot. As another important feature, the connection of the support members provides for over travel in the tilting or axial or rotary movement in order to prevent damage to the robot or tooling or to an article or device carried by the tooling. As an additional feature, when the force producing the tilting or axial or rotary movement is released, the support members automatically return to their precisely aligned normal position or relationship so that operation of the robot may be quickly resumed with the minimum of down time.

As mentioned above, the coupling embodiment described above in connection with FIGS. 10 and 11 uses a source of low pressure air to actuate the pressure switch 198. In comparison, the embodiments described in connection with FIGS. 1-9 and 12-19 operate with a direct switch actuation, either with the micro limt switches 135 or the switches produced by the series-connected metal components such as shown in FIG. 7. It is also apparent that the auxilary biasing unit 260 shown in FIGS. 13 and 14 and the rotary sensing unit 335 and vertical sensing unit 372 shown in FIGS. 15-18 may be used independently with any of the coupling units or devices described above.

While the forms of safety coupling devices or apparatus herein described constitute preferred embodiments of the invention, it is to be understood that the invention is not limited to these precise forms of apparatus, and that changes may be made therein within departing from the scope and spirit of the invention as defined in the appended claims.

The invention having thus been described, the following is claimed:

1. A robot assembly for moving tooling along a predetermined path, comprising an arm, means supporting said arm for predetermined vertical and horizontal movement, a safety coupling connecting said tooling to said arm to protect against inadvertent damage to said robot and/or said tooling and to minimize down time of said robot, said coupling including a first support member, means for securing said first support member to said arm of said robot, a second support member, means for securing said second support member to said tooling, means connecting said first and second support members and providing for relative universal tilting movement between said first and second support member from a normal position where said first support member is aligned on an axis with said second support member, said connecting means including plurality of at least three pin members secured to one of said support members and spaced angularly about said axis, said pin members projecting outwardly in a spoke-like manner from said one support member with each said pin member having a radial axis and an outer end portion, the other said support member having means defining a corresponding plurality of cavities receiving said outer end portions of said pin members for relative movement within said cavities, seat members mounted on said other support member and forming a precision and positive stop surface within each of said cavities, stop members carried by said outer end portions of said pin members and engaging the corresponding said seat members when said first and second support member are axially aligned at said normal position, means for biasing said stop members against said seat members, said other support member being free to tilt relatively to each of said pin members and against said biasing means, said stop members being movable with said pin members within said cavities when said other support member tilts relative to said one support member, and control means responsive to said tilting movement for stopping the movement of said arm of said robot.

2. The assembly as defined in claim 1 wherein each of said stop member comprises a roller member supported by said outer end portion of the corresponding said pin member for rotation on said radial axis of said pin member.

3. The assembly as defined in claim 1 and including an electrical circuit with said seat members electrically connected in series with said stop members, and said circuit opens by separation of at least one of said seat members from the corresponding said stop member in response to relative tilting or axial movement between said support members.

4. The assembly as defined in claim 1 wherein said biasing means comprise a set of part-circular ring sections removably mounted on each of said support members and projecting radially outwardly therefrom, and a plurality of circumferentially spaced compression springs extending axially between said corresponding ring sections on said support members.

5. The assembly as defined in claim 4 and including a set of link members, and means for attaching said link members to corresponding said ring sections in one position for transporting the assembly of said ring sections and springs and in a second position connecting mating said ring sections after said ring sections are mounted on said support members.

6. The assembly as defined in claim 1 wherein both of said support members are annular and defined corresponding center openings, and said cavities and pin members are located outwardly of center openings.

7. The assembly as defined in claim 1 wherein said first and second support members comprise bodies of plastics material.

8. The assembly as defined in claim 1 wherein one of said securing means comprise rotary bearing means supporting the corresponding said support member for rotation in either direction from a home position, and spring means for torsionally biasing said support member to said home position.

9. The assembly as defined in claim 8 wherein said rotary bearing means comprise a first bearing plate secured to the corresponding said support member, a second bearing plate disposed adjacent said first bearing plate, a plurality of arcuate slots within one of said bearing plates, a corresponding plurality of springs within said slots, and a corresponding plurality of studs projecting from the other said bearing plate into said slot adjacent said springs.

10. The assembly as defined in claim 1 wherein said connecting means further include a set of three support element mounted on one of said support members in angularly spaced relation, means forming corresponding seats on the other said support member, and said support element project axially to engage said seats to defined said normal position.

* * * * *

UNITED STATES PATENT AND TRADEMARK OFFICE
CERTIFICATE OF CORRECTION

PATENT NO. : 4,954,005

DATED : September 4, 1990

INVENTOR(S) : Harold E. Knasel & David A. Grigsby

It is certified that error appears in the above-identified patent and that said Letters Patent is hereby corrected as shown below:

Column 2, line 45, delete "an" (second occurrence) and insert --and--.
Column 3, line 47, cancel "secured" and insert --secure--.
Column 4, line 27, cancel "spring" and insert --springs--.
Column 5, line 58, cancel "swicth" and insert --switch--.
Column 7, line 11, cancel "projects" and insert --project--.
Column 7, line 20, cancel "paor" and insert --pair--.
Column 7, line 30, cancel "accordind" and insert --according--.
Column 8, line 10, cancel "alos" and insert --also--.
Column 9, line 33, cancel "biased" and insert --biases--.
Column 10, line 2, cancel "supports" and insert --support--.
Column 10, line 47, cancel "limt" and insert --limit--.
Column 11, lines 8 and 9, cancel "member " and insert --members--.
Column 11, line 11, after "including" insert --a--.
Column 11, line 26, cancel "member" and insert --members--.
Column 12, line 18, cancel "defined" and insert --define--.
Column 12, line 38, cancel "slot" and insert --slots--.
Column 12, line 41, cancel "element" and insert --elements--.
Column 12, line 44, cancel "element" and insert --elements--.

UNITED STATES PATENT AND TRADEMARK OFFICE
CERTIFICATE OF CORRECTION

PATENT NO. : 4,954,005

DATED : September 4, 1990

INVENTOR(S) : Harold E. Knasel & David A. Grigsby

It is certified that error appears in the above-identified patent and that said Letters Patent is hereby corrected as shown below:

Column 12, line 45, cancel "defined" and insert --define--.

Signed and Sealed this

Tenth Day of December, 1991

*Attest:*

HARRY F. MANBECK, JR.

*Attesting Officer*      *Commissioner of Patents and Trademarks*